US011942265B2

(12) United States Patent

Matsumoto et al.

(10) Patent No.: US 11,942,265 B2

(45) Date of Patent: Mar. 26, 2024

(54) INDUCTOR

(71) Applicant: SHINKO ELECTRIC INDUSTRIES CO., LTD., Nagano (JP)

(72) Inventors: Takayuki Matsumoto, Nagano (JP); Tsukasa Nakanishi, Nagano (JP)

(73) Assignee: SHINKO ELECTRIC INDUSTRIES CO., LTD., Nagano (JP)

( * ) Notice: Subject to any disclaimer, the term of this patent is extended or adjusted under 35 U.S.C. 154(b) by 420 days.

(21) Appl. No.: 16/906,182

(22) Filed: Jun. 19, 2020

(65) Prior Publication Data

US 2020/0411232 A1 Dec. 31, 2020

(30) Foreign Application Priority Data

Jun. 25, 2019 (JP) ................................ 2019-117734

(51) Int. Cl.
*H01F 27/32* (2006.01)
*H01F 27/24* (2006.01)
(Continued)

(52) U.S. Cl.
CPC ........... *H01F 27/327* (2013.01); *H01F 27/24* (2013.01); *H01F 27/2804* (2013.01);
(Continued)

(58) Field of Classification Search
CPC .... H01F 27/327; H01F 27/24; H01F 27/2804; H01F 27/29; H01F 41/041; H01F 41/127;
(Continued)

(56) References Cited

U.S. PATENT DOCUMENTS 9,786,428 B2 * 10/2017 Yang .................... H01F 27/292
10,312,014 B2 * 6/2019 Lee ...................... H01F 27/292
(Continued)

FOREIGN PATENT DOCUMENTS

JP 7-201575 8/1995
JP 2014-013815 A 1/2014
(Continued)

OTHER PUBLICATIONS

Japanese Office Action dated Dec. 6, 2022 issued in corresponding Japanese application No. 2019-117734; English machine translation included (6 pages).
(Continued)

*Primary Examiner* — Mang Tin Bik Lian

(74) *Attorney, Agent, or Firm* — Rankin, Hill & Clark LLP

(57) ABSTRACT

An inductor includes: a first conductor layer including: a pair of first metal pieces; and a first conductor, wherein the first conductor is wound in a spiral shape in the same plane; a second conductor layer including: a pair of second metal pieces, wherein each of the pair of second metal pieces is bonded to a corresponding one of the pair of first metal pieces; and a second conductor, wherein the second conductor is wound in a spiral shape in the same plane, and the second conductor includes an inner circumferential side end portion bonded to an inner circumferential side end portion of the first conductor; a pair of electrodes each of which is bonded to a corresponding one of the pair of second metal pieces; and a sealing resin that covers the first conductor layer, the second conductor layer and the pair of electrodes.

5 Claims, 18 Drawing Sheets

(51) Int. Cl.

| | |
|---|---|
| ***H01F 27/28*** | (2006.01) |
| ***H01F 27/29*** | (2006.01) |
| ***H01F 41/04*** | (2006.01) |
| ***H01F 41/12*** | (2006.01) |

(52) U.S. Cl.
CPC ........... *H01F 27/29* (2013.01); *H01F 41/041* (2013.01); *H01F 41/127* (2013.01); *H01F 2027/2809* (2013.01)

(58) Field of Classification Search
CPC ......... H01F 2027/2809; H01F 27/2852; H01F 2017/048; H01F 27/292
See application file for complete search history.

(56) References Cited

U.S. PATENT DOCUMENTS

| | | | | |
|---|---|---|---|---|
| 2008/0186125 | A1* | 8/2008 | Yamamoto | H01F 17/0013 336/200 |
| 2008/0257488 | A1* | 10/2008 | Yamano | H01F 41/00 156/274.2 |
| 2010/0219925 | A1* | 9/2010 | Yamamoto | H01F 41/041 29/606 |
| 2014/0009254 | A1 | 1/2014 | Ohkubo et al. | |
| 2015/0048915 | A1* | 2/2015 | Yoon | H01F 17/0013 336/192 |
| 2015/0357115 | A1* | 12/2015 | Ohkubo | H01F 27/2804 336/192 |
| 2016/0276089 | A1* | 9/2016 | Inoue | H01F 17/0033 |
| 2017/0098997 | A1* | 4/2017 | Hamada | G06F 1/3296 |
| 2017/0169930 | A1 | 6/2017 | Kudo et al. | |
| 2017/0179913 | A1* | 6/2017 | Song | H01F 27/2804 |
| 2018/0122557 | A1* | 5/2018 | Kim | H01F 41/041 |
| 2018/0182537 | A1* | 6/2018 | Shimizu | H01F 27/29 |
| 2019/0066908 | A1* | 2/2019 | Ueda | H01F 17/0013 |
| 2019/0318867 | A1* | 10/2019 | Lee | H01F 5/06 |
| 2019/0348214 | A1* | 11/2019 | Tobita | H01F 17/0013 |
| 2020/0020477 | A1* | 1/2020 | Kang | H01F 27/2804 |
| 2020/0304025 | A1 | 9/2020 | Hamada et al. | |

FOREIGN PATENT DOCUMENTS

| | | | |
|---|---|---|---|
| JP | 2017-69523 | A | 4/2017 |
| JP | 2017-107971 | A | 6/2017 |
| JP | 2018-82092 | A | 5/2018 |

OTHER PUBLICATIONS

Japanese Office Action dated May 23, 2023, Japanese Patent Application No. 2019-117734, English abstract included, 5 pages.

* cited by examiner

INDUCTOR

This application claims priority from Japanese Patent Applications No. 2019-117734, filed on Jun. 25, 2019, the entire contents of which are herein incorporated by reference.

BACKGROUND

1. Technical Field

The present disclosure relates to an inductor.

2. Background Art

Generally, an inductor is used as a passive component mounted on a circuit substrate. The inductor has a spiral coil. Such a coil may use a layered structure in which layers of a plurality of conductors are deposited on one another (see e.g., JP-A-7-201575).

In the background-art inductor, outer circumferential side end portions of the conductors protrude as external electrodes from outer side faces of a sealing resin. For this reason, the size of the inductor increases on the sides of the sealing resin. As a result, there is a problem that reduction in the size of the inductor is impeded.

Technology of the present disclosure has been accomplished in consideration of the aforementioned circumstances. An object of the present disclosure is to provide an inductor which can be reduced in size.

SUMMARY

Certain embodiments provide an inductor comprising:

a first conductor layer comprising:

a pair of first metal pieces; and a first conductor, wherein the first conductor extends from one of the pair of first metal pieces toward the other first metal piece to be wound in a spiral shape in the same plane;

a second conductor layer comprising:

a pair of second metal pieces, wherein each of the pair of second metal pieces is bonded to a corresponding one of the pair of first metal pieces; and a second conductor, wherein the second conductor extends from one of the pair of second metal pieces toward the other second metal piece to be wound in a spiral shape in the same plane, and the second conductor comprises an inner circumferential side end portion bonded to an inner circumferential side end portion of the first conductor;

a pair of electrodes each of which is bonded to a corresponding one of the pair of second metal pieces; and a sealing resin that covers the first conductor layer, the second conductor layer and the pair of electrodes, wherein end faces of the pair of electrodes are exposed in a lower face of the sealing resin facing the second conductor.

DESCRIPTION OF EMBODIMENT

An Example of an inductor and a method for manufacturing the inductors disclosed by the present application will be described below in detail based on the drawings. Incidentally, technology to be disclosed herein is not limited by the Example.

Example

[Configuration of Inductor]

Figure 1:
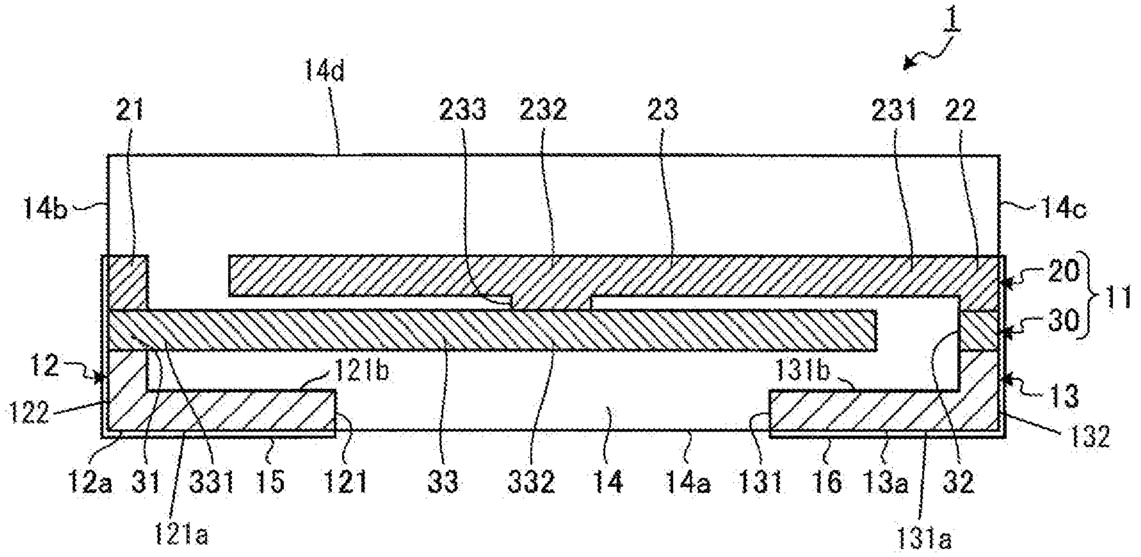
FIG. 1 is a view showing an example of the configuration of an inductor according to an Example.
Figure 2:
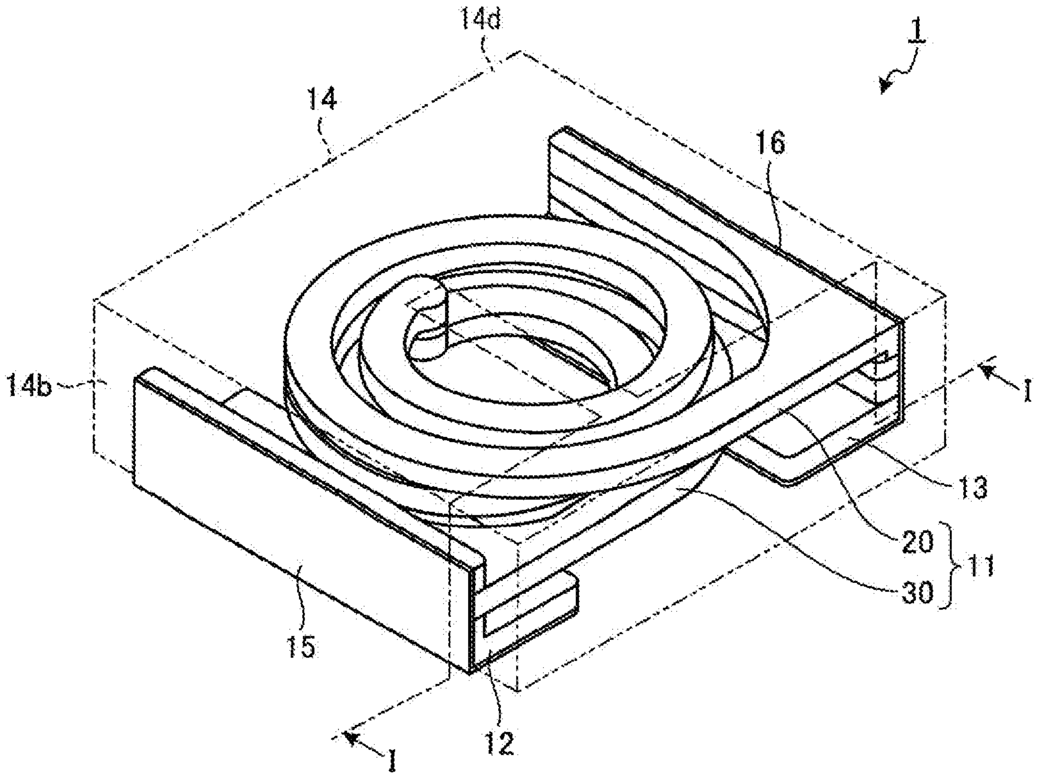
FIG. 2 is a perspective view of an upper face side of the inductor according to the Example.
Figure 3:
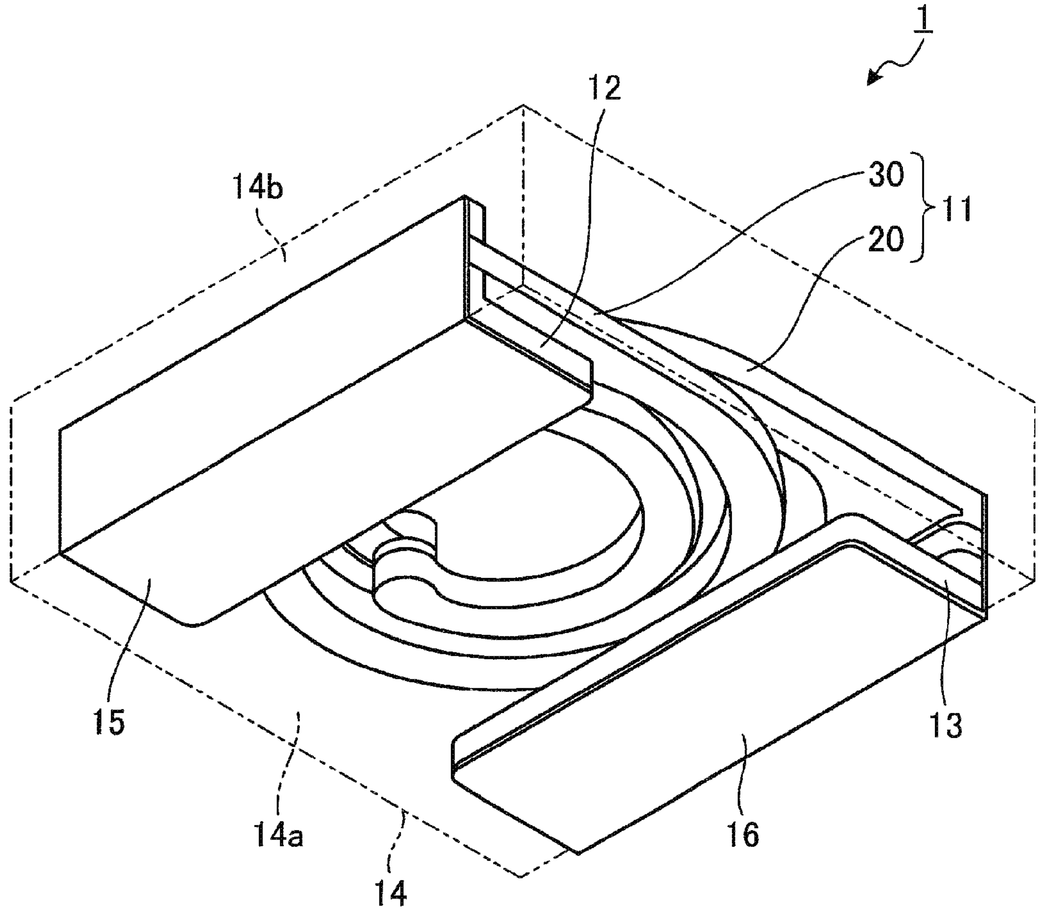
FIG. 3 is a perspective view of a lower face side of the inductor according to the Example.

FIG. 1 is a view showing an example of the configuration of an inductor 1 according to an Example. A section of the inductor 1 is schematically shown in FIG. 1. An upper side face and a lower side face on paper in FIG. 1 will be hereinafter referred to as upper face and lower face respectively for explanatory convenience. However, the inductor 1 may be, for example, used in a vertically inverted state, or may be used at any posture. FIG. 2 is a perspective view of an upper face side of the inductor 1 according to the Example. FIG. 3 is a perspective view of a lower face side of the inductor 1 according to the Example. A section taken along a line I-I shown in FIG. 2 corresponds to the section of the inductor 1 shown in FIG. 1.

As shown in FIG. 1 to FIG. 3, the inductor 1 has a coil 11, a pair of electrodes 12 and 13 and a sealing resin 14.

Figure 4:
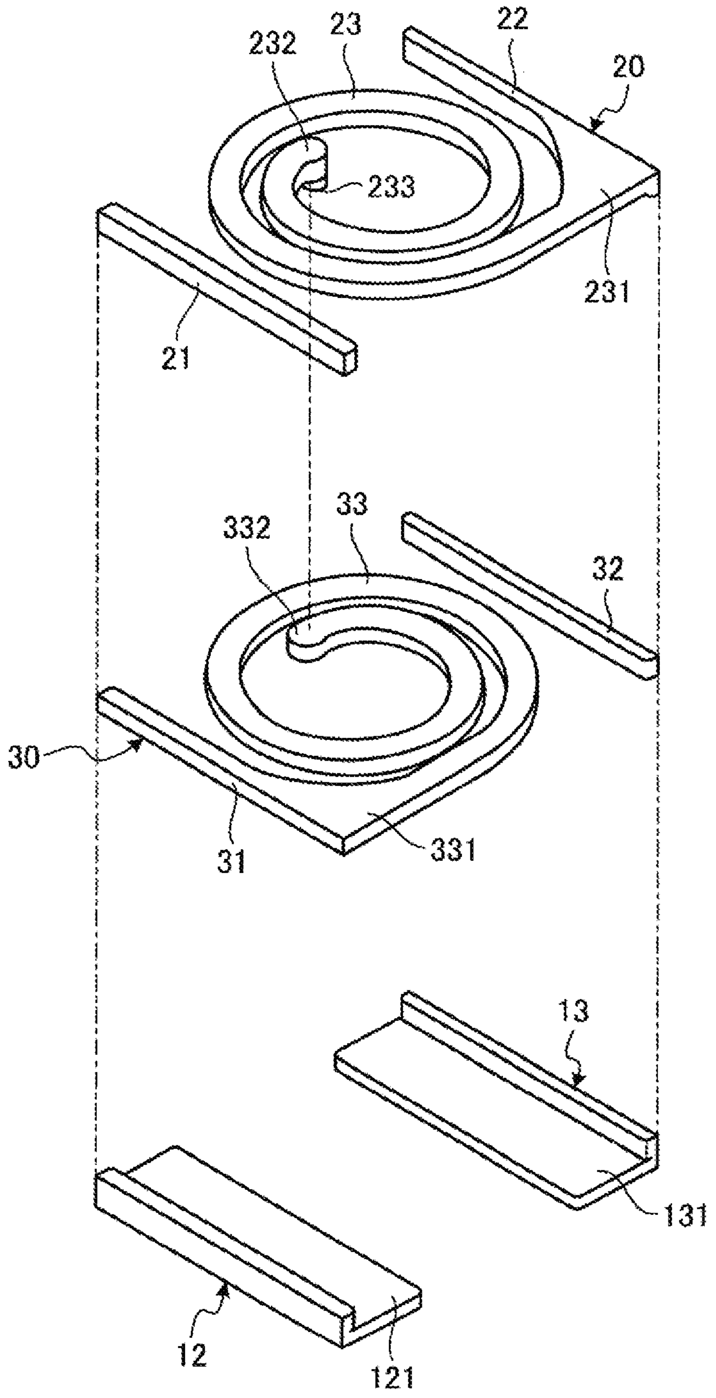
FIG. 4 is a perspective view showing a state in which a first conductor layer, a second conductor layer and a pair of electrodes are separated from one another.

The coil 11 has a two-layer structure in which two conductor layers are deposited on each other. Specifically, the coil 11 has a first conductor layer 20 and a second conductor layer 30, as shown in FIG. 4. FIG. 4 is a perspective view showing a state in which the first conductor layer 20, the second conductor layer 30 and the pair of electrodes 12 and 13 are separated from one another.

The first conductor layer 20 is, for example, formed from metal such as copper. The first conductor layer 20 has a pair of first metal pieces 21 and 22 and a first conductor 23. The pair of first metal pieces 21 and 22 are provided at positions to face each other in one and the same plane.

The first conductor 23 extends from one of the pair of first metal pieces 21 and 22 toward the other first metal piece 21, 22 to be wound in a spiral shape in one and the same plane. That is, for example, as shown in FIG. 4, the first conductor 23 having an outer circumferential side end portion 231 connected to the first metal piece 22 is wound in a clockwise spiral shape.

An inner circumferential side end portion 232 of the first conductor 23 serves as a bonding portion to the second conductor layer 30. That is, the first conductor 23 has a protrusion portion 233 provided on the inner circumferential side end portion 232 so as to protrude more outward than the other portion of the first conductor 23. The protrusion portion 233 is superimposed on an inner circumferential side end portion 332 of the second conductor 33 to be bonded thereto. The second conductor 33 will be described later.

In addition, in the first conductor layer 20, thicknesses of the pair of first metal pieces 21 and 22 are the same as thickness (thickness including thickness of the protrusion portion 233) of the inner circumferential side end portion 232 of the first conductor 23. Lower faces of the pair of first metal pieces 21 and 22 protrude more outward than a lower face of the other portion of the first conductor 23 than the protrusion portion 233. An upper face of the first conductor layer 20 is formed such that all the parts thereof are flush with one another. That is, the other portion of the first conductor 23 than the protrusion portion 233 is half-etched from the lower face side of the first conductor 23 to be made thinner than the protrusion portion 233. Thus, contact between the lower face of the other portion of the first conductor 23 than the protrusion portion 233 and an upper face of the second conductor 33 which will be described later can be prevented when the first conductor layer 20 and the second conductor layer 30 are superimposed on each other to be bonded thereto in a bonding step which will be described later.

The second conductor layer 30 is, for example formed from metal such as copper. The second conductor layer 30 has a pair of second metal pieces 31 and 32 and a second conductor 33. The pair of second metal pieces 31 and 32 which are provided at positions to face each other in one and the same plane are superimposed on the pair of first metal pieces 21 and 22 to be bonded thereto respectively. Since the pair of second metal pieces 31 and 32 are superimposed on the pair of first metal pieces 21 and 22 to be bonded thereto respectively, the pair of first metal pieces 21 and 22 and the pair of second metal pieces 31 and 32 form opposite end portions of the coil 11.

The second conductor 33 extends from one of the pair of second metal pieces 31 and 32 toward the other second metal piece 31, 32 to be wound in a spiral shape in one and the same plane. The second conductor 33 is wound in a reverse direction to a direction in which the first conductor 23 is wound. That is, for example, as shown in FIG. 4, the second conductor 33 having an outer circumferential side end portion 331 connected to the second metal piece 31 is wound in a counterclockwise spiral shape.

The inner circumferential side end portion 332 of the second conductor 33 serves as a bonding portion to the first conductor layer 20. That is, the inner circumferential side end portion 332 of the second conductor 33 is superimposed on the protrusion portion 233 of the first conductor 23 to be bonded thereto.

The pair of electrodes 12 and 13 are, for example, formed from metal such as copper. The pair of electrodes 12 and 13 are superimposed on the pair of second metal pieces 31 and 32 to be bonded thereto respectively.

The sealing resin 14 is formed so as to entirely cover the coil 11 (i.e. the first conductor layer 20 and the second conductor layer 30) and the pair of electrodes 12 and 13. The sealing resin 14 has a lower face 14*a*, an upper face 14*d* and side faces 14*b* and 14*c*. The lower face 14*a* faces the second conductor 33. The upper face 14*d* faces the first conductor 23 and is positioned on an opposite side to the lower face 14*a*. The side faces 14*b* and 14*c* are positioned between the lower face 14*a* and the upper face 14*d*. Outer side faces 12*a* and 13*a* of the pair of electrodes 12 and 13 are exposed in the lower face 14*a* of the sealing resin 14. Specifically, the electrode 12 has a bonding portion 122 and an overhanging portion 121. The bonding portion 122 is bonded to the second metal piece 31. The overhanging portion 121 overhangs from the bonding portion 122. The overhanging portion 121 has an upper face 121*b* and a lower face 121*a*. The upper face 121*b* faces the second conductor 33. The lower face 121*a* is positioned on an opposite side to the upper face 121*b*. The lower face 121*a* of the overhanging portion 121 is exposed from the lower face 14*a* of the sealing resin 14. In addition, the electrode 13 has a bonding portion 132 and an overhanging portion 131. The bonding portion 132 is bonded to the second metal piece 32. The overhanging portion 131 overhangs from the bonding portion 132. The overhanging portion 131 has an upper face 131*b* and a lower face 131*a*. The upper face 131*b* faces the second conductor 33. The lower face 131*a* is positioned on an opposite side to the upper face 131*b*. The lower face 131*a* of the overhanging portion 131 is exposed from the lower face 14*a* of the sealing resin 14.

The end faces 12*a* and 13*a* of the pair of electrodes 12 and 13 exposed in the lower face 14*a* of the sealing resin 14 are faces which will be finally connected to electrodes of a circuit substrate. That is, the pair of electrodes 12 and 13 form external electrodes for connecting the opposite end portions of the coil 11 to the electrodes of the circuit substrate. Since the end faces 12*a* and 13*a* of the pair of electrodes 12 and 13 which are the external electrodes are exposed in the lower face 14*a* of the sealing resin 14, the external electrodes do not protrude from the side faces 14*b* and 14*c* of the sealing resin 14. Therefore, the size of the inductor 1 does not increase on the sides of the sealing resin 14. As a result, reduction of the size of the inductor 1 can be attained.

In addition, outer side faces of the pair of first metal pieces 21 and 22, outer side faces of the pair of second metal pieces 31 and 32 and outer side faces of the pair of electrodes 12 and 13 are exposed in the side faces 14*b* and 14*c* intersecting with the lower face 14*a* of the sealing resin 14. Plating films 15 and 16 are formed so as to cover the exposed end faces 12*a* and 13*a* of the pair of electrodes 12 and 13, the exposed outer side faces of the pair of first metal pieces 21 and 22, the exposed outer side faces of the pair of second metal pieces 31 and 32 and the exposed outer side faces of the pair of electrodes 12 and 13. Since the plating films 15 and 16 are formed on the end faces 12*a* and 13*a* of the pair of electrodes 12 and 13 and the outer side faces of the pair of electrodes 12 and 13, solders get wet to spread along the plating films 15 and 16 when the pair of electrodes 12 and 13 are soldered to the electrodes of the circuit substrate. Thus, fillets generated by the solders are formed between the outer side faces of the pair of electrodes 12 and 13 and the electrodes of the circuit substrate so that the pair of electrodes 12 and 13 and the electrodes of the circuit substrate can be connected to each other firmly. As a result, connection reliability can be improved.

In addition, for example, a magnetic material-including resin having a magnetic material and an insulating resin mixed with each other can be used as the sealing resin 14. For example, a material having an Fe-based amorphous alloy subjected to outer circumference insulation treatment, a material having carbonyl iron powder subjected to outer circumference insulation treatment, or ferrite powder can be used as the magnetic material. The insulating resin serves as a binder. The magnetic material-including resin is generated by blending, for example, a thermosetting resin such as an epoxy resin as the binder with the magnetic material. Here, when the magnetic material included in the magnetic material-including resin has electric conductivity, it is preferable that an insulating film made of an insulating resin is provided on the surface of the first conductor layer 20, the surface of the second conductor layer 30 and the surfaces of the pair of electrodes 12 and 13 to attain insulation from the magnetic material-including resin. By use of the magnetic material-including resin as the sealing resin 14, an inductance value of the inductor 1 can be improved.

[Method for Manufacturing Inductors]

Figure 5:
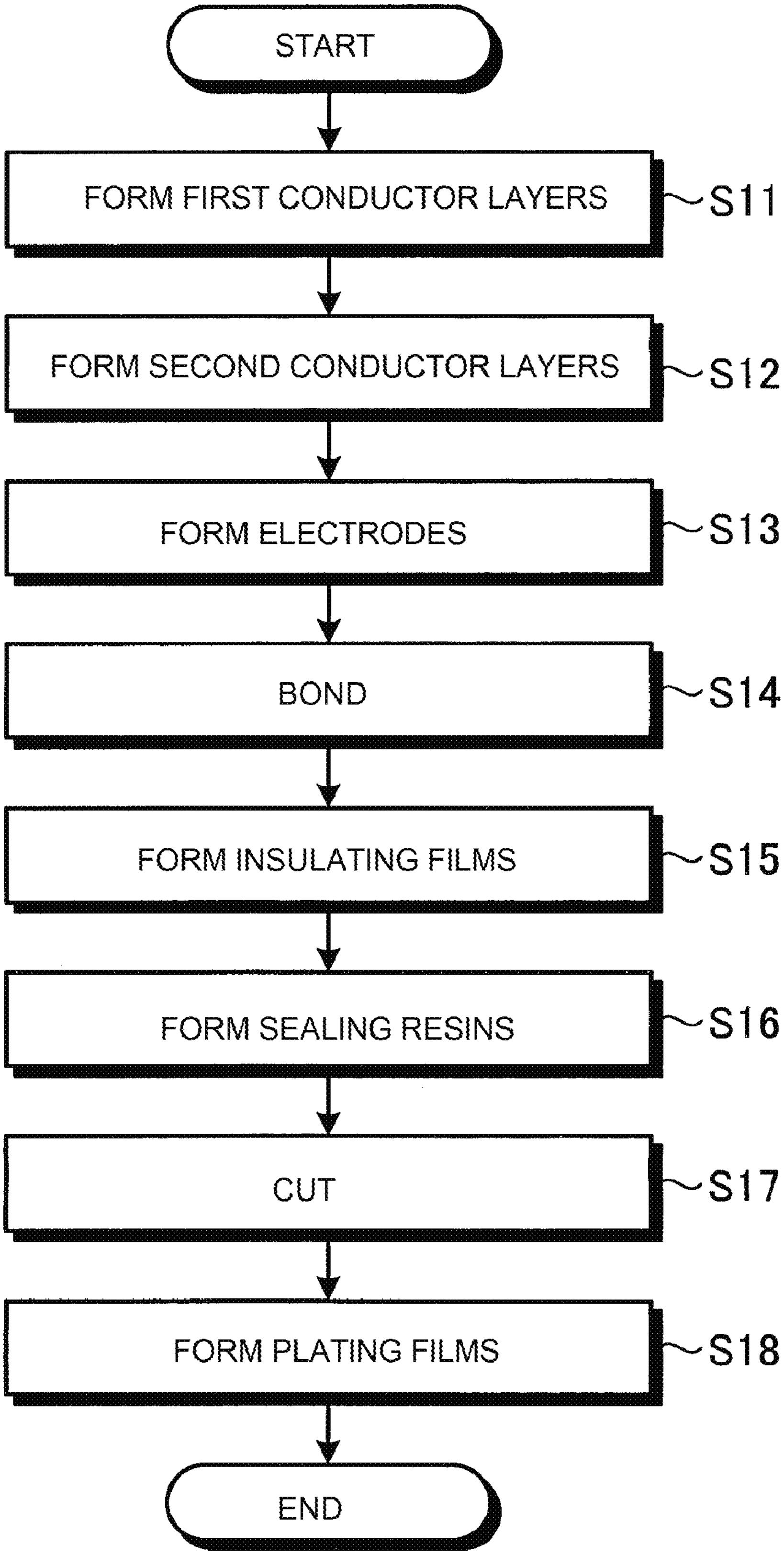
FIG. 5 is a flow chart showing a method for manufacturing the inductors according to the Example.

Next, a specific example about a method for manufacturing the inductors 1 having the aforementioned configuration will be described with reference to FIG. 5. FIG. 5 is a flow chart showing the method for manufacturing the inductors 1 according to the Example.

Figure 6:
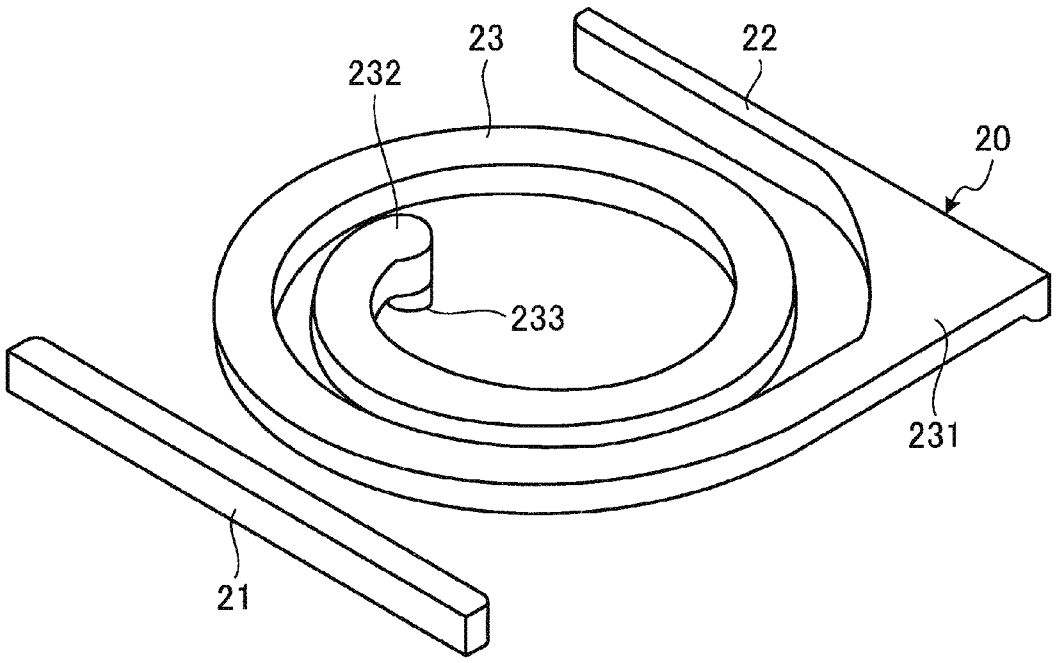
FIG. 6 is a view showing a specific example of a first conductor layer forming step.
Figure 7:
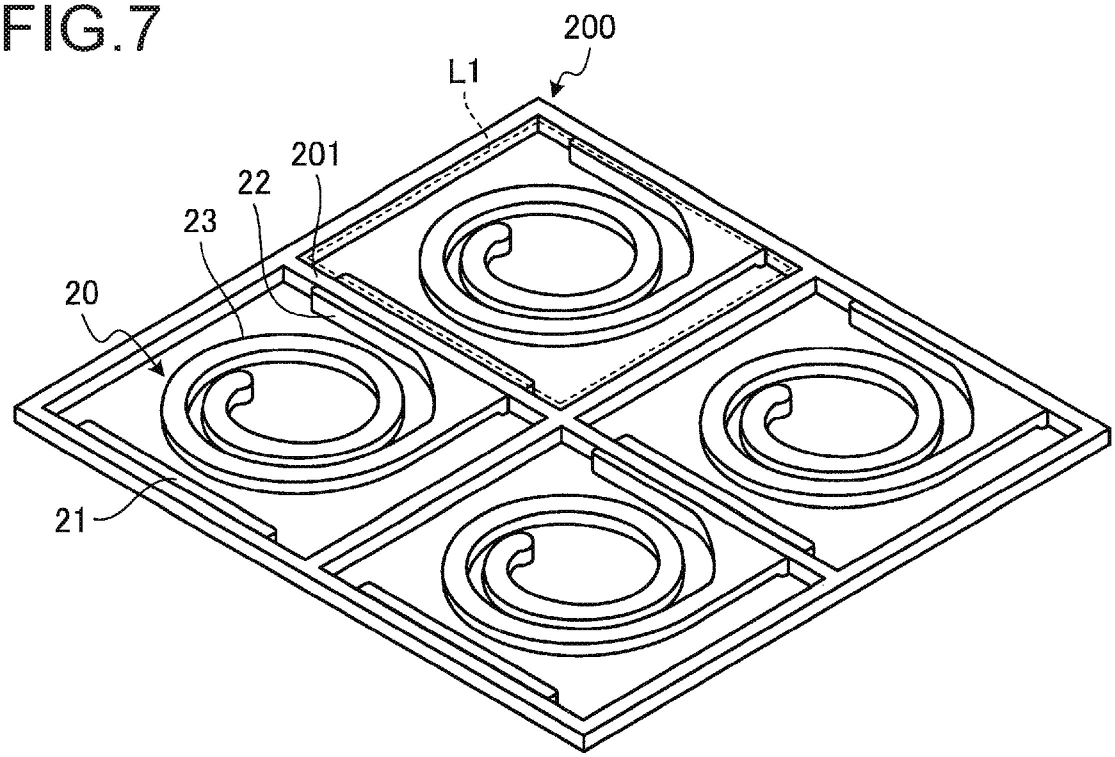
FIG. 7 is a perspective view of a first metal plate.

First, first conductor layers 20 each of which has a pair of first metal pieces 21 and 22 and a first conductor 23 are formed (step S11). That is, a first metal plate which is, for example, made of metal such as copper is etched so that the first conductor layers 20 each of which has the pair of first metal pieces 21 and 22 and the first conductor 23 are formed, for example, as shown in FIG. 6. FIG. 6 is a view showing a specific example of the first conductor layer forming step. The first metal plate has a plurality of individual regions which are arrayed in a matrix form. The first conductor layers 20 are formed in the individual regions of the first metal plate respectively. For example, as shown in FIG. 7, a first metal plate 200 has 2×2 individual regions which are arrayed in a matrix form, and first conductor layers 20 are formed in the individual regions of the first metal plate 200 respectively. FIG. 7 is a perspective view of the first metal plate 200. At a stage where the first conductor layers 20 are formed in the individual regions of the first metal plate 200 respectively, a pair of first metal plates 21 and 22 of each of the first conductor layers 20 are connected to a connecting frame 201 formed between adjacent ones of the individual regions. When the first metal plate 200 is cut along cutting lines L1 positioned in boundaries of the individual regions, the first conductor layers 20 are individually separated from the connecting frame 201, as shown in FIG. 6. However, the first metal plate 200 has not been cut yet at the stage where the first conductor layers 20 are formed.

Figure 8:
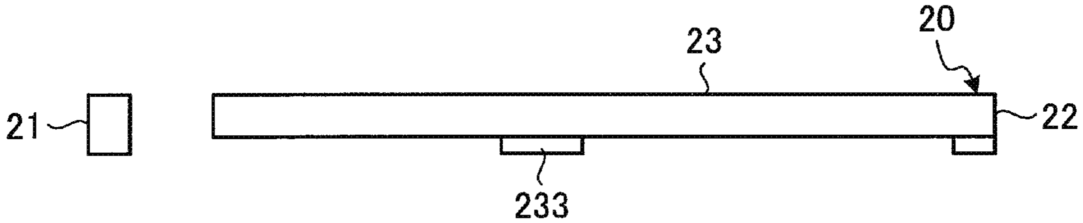
FIG. 8 is a side view of the first conductor layer.

In each of the first conductor layers 20, a first conductor 23 is formed by etching and half etching so that a protrusion portion 233 protruding more outward than the other portion of the first conductor 23 is provided on an inner circumferential side end portion 232, for example, as shown in FIG. 8. FIG. 8 is a side view of the first conductor layer 20. The protrusion portion 233 is formed integrally with the inner circumferential side end portion 232 of the first conductor 23. Thus, electrical resistance of a bonding portion between the first conductor layer 20 and a second conductor layer 30 can be reduced.

In addition, thicknesses of the pair of first metal pieces 21 and 22 and thickness (thickness including thickness of the protrusion portion 233) of the inner circumferential side end portion 232 of the first conductor 23 are the same as thickness of the first metal plate 200 which has not been worked yet. That is, the other portion of the first conductor 23 than the protrusion portion 233 is half-etched from a lower face side of the first conductor 23 so as to be thinner than the first metal plate 200 which has not been worked yet. In addition, thickness of the connecting frame 201 is also the same as the thickness of the first metal plate 200 which has not been worked yet.

Figure 9:
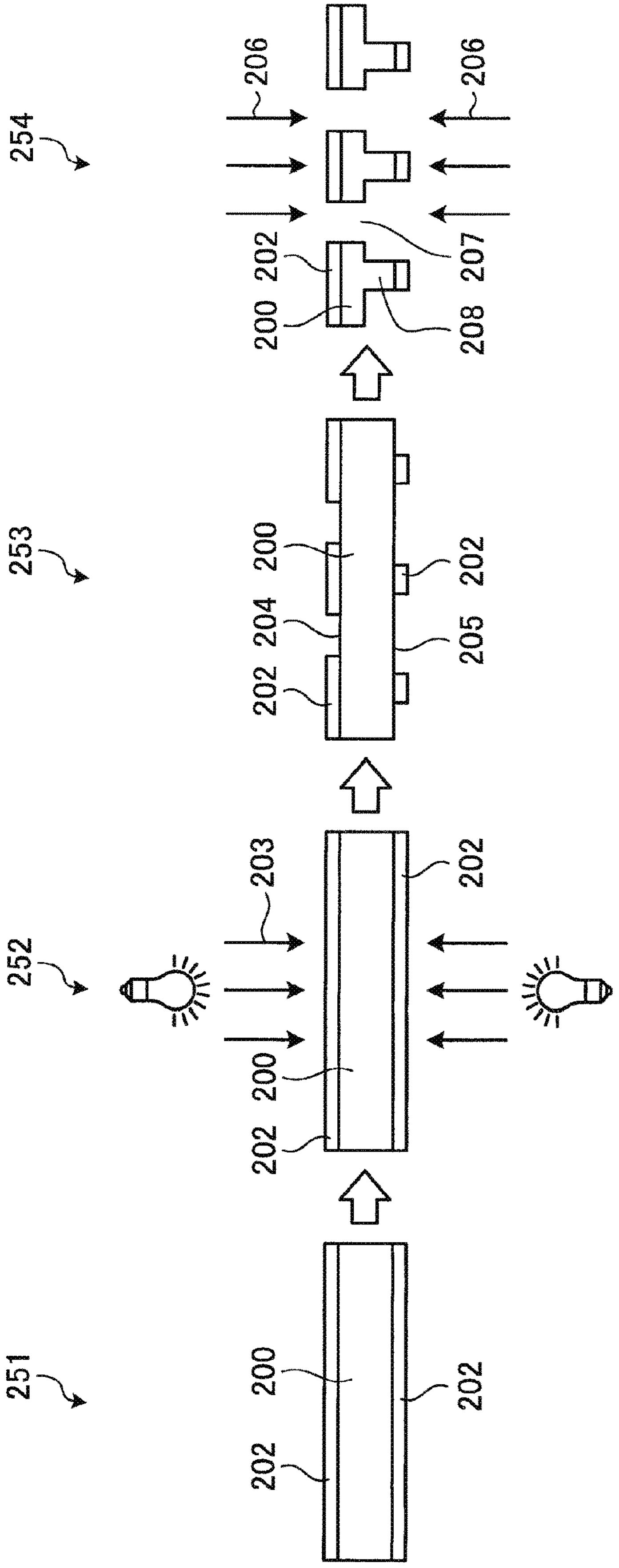
FIG. 9 is a view for explaining formation of the first conductor layers by etching and half etching.

Here, the formation of the first conductor layers 20 by etching and half etching will be described simply. FIG. 9 is a view for explaining the formation of the first conductor layers 20 by etching and half etching.

First, a first metal plate 200 shaped like a flat plate is prepared. As shown in a state 251, resists 202 are applied to an entire upper face and an entire lower face of the first metal plate 200 respectively and dried. Successively, photomasks having desired patterns are disposed on the resists 202 respectively. As shown in a state 252, the resists 202 are exposed to light by radiation of light 203 on the resists 202. Successively, the resists 202 which have been exposed to light are developed so that the resists 202 having predetermined openings are formed. That is, for example, as shown in a state 253, opening portions 204 are formed in portions where the first metal plate 200 will be etched from the upper face side to be penetrated. In addition, openings 205 are formed in portions where the first metal plate 200 will be half-etched and etched from the lower face side. Successively, the first metal plate 200 is etched by a corrosion solution 206 with the resists 202 as masks. Thus, as shown in a state 254, through holes 207 are formed at places where the corrosion solution 206 can be supplied from both the upper face and the lower face of the first metal plate 200. On the other hand, the lower face of the first metal plate 200 is half-etched so that thick portions 208 are formed at places where the corrosion solution 206 cannot be supplied from the upper face of the first metal plate 200. Each of the thick portions 208 corresponds to a protrusion portion 233 in FIG. 8. Then, the resists 202 are removed. Thus, first conductor layers 20 are formed.

Incidentally, the case where the first conductor layers 20 are formed by etching and half etching has been shown in the Example. However, the first conductor layers 20 may be formed by pressing.

Figure 10:
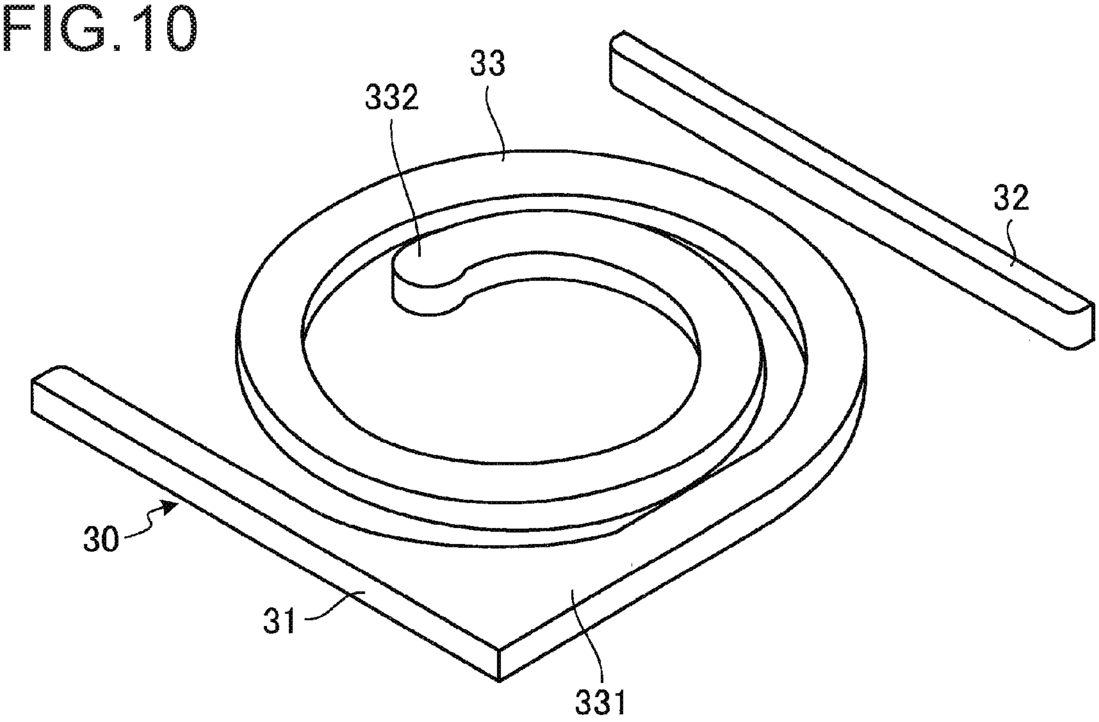
FIG. 10 is a view showing a specific example of a second conductor layer forming step.
Figure 11:
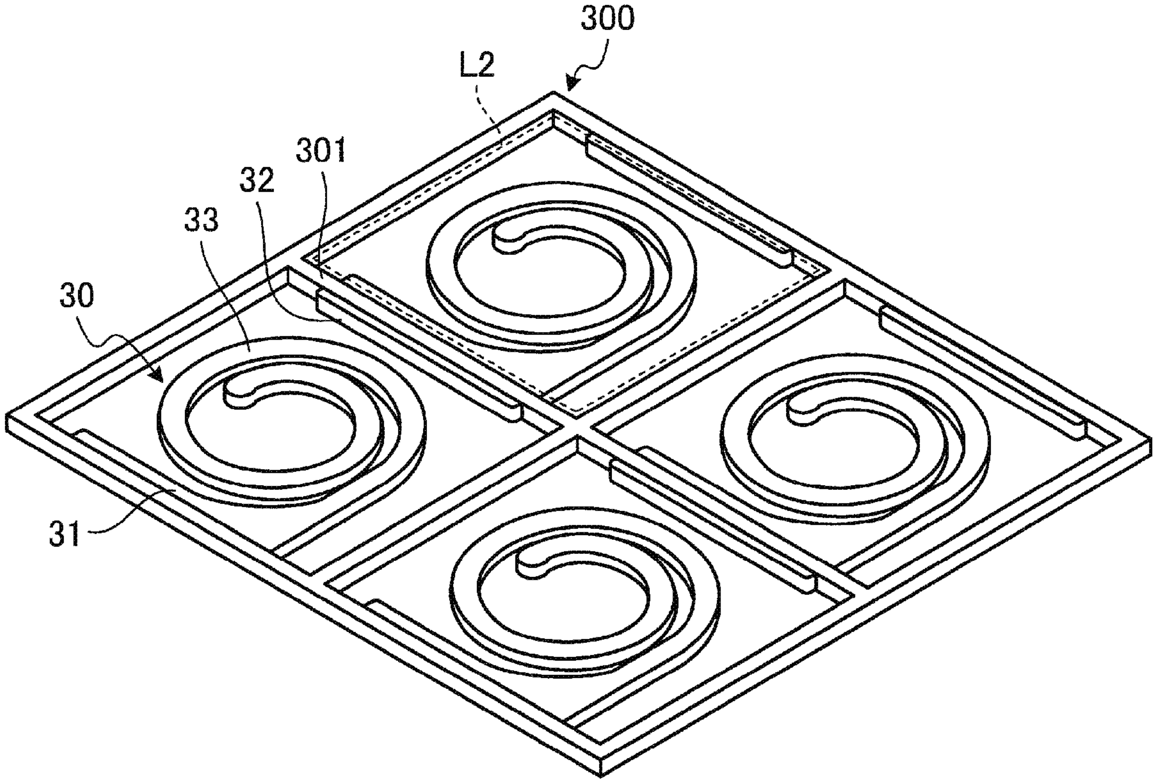
FIG. 11 is a perspective view of a second metal plate.

When the first conductor layers 20 have been formed, second conductor layers 30 each of which has a pair of second metal pieces 31 and 32 and a second conductor 33 are formed (step S12). That is, a second metal plate which is, for example, made of metal such as copper and which is shaped like a flat plate is etched so that the second conductor layers 30 each of which has the pair of second metal pieces 31 and 32 and the second conductor 33 are formed, for example, as shown in FIG. 10. FIG. 10 is a view showing a specific example of the second conductor layer forming step. The second metal plate has a plurality of individual regions arrayed in a matrix form. The second conductor layers 30 are formed in the individual regions of the second metal plate respectively. For example, as shown in FIG. 11, a second metal plate 300 has 2×2 individual regions arrayed in a matrix form, and second conductor layers 30 are formed in the individual regions of the second metal plate 300 respectively. FIG. 11 is a perspective view of the second metal plate 300. At a stage where the second conductor layers 30 are formed in the individual regions of the second metal plate 300 respectively, a pair of second metal pieces 31 and 32 of each of the second conductor layer 30 are connected to a connecting frame 301 formed between adjacent ones of the individual regions. When the second metal plate 300 is cut along cutting lines L2 positioned in boundaries of the individual regions, the second conductor layers 30 are individually separated from the connecting frame 301, as shown in FIG. 10. However, the second metal plate 300 has not been cut yet at the stage where the second conductor layers 30 are formed.

Figure 12:
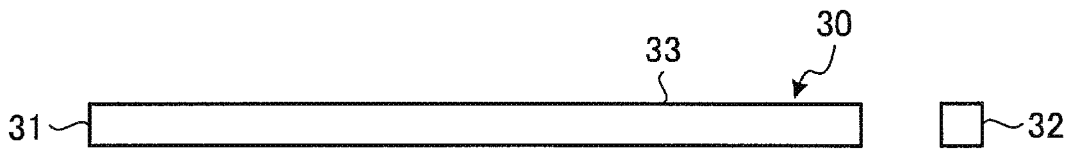
FIG. 12 is a side view of the second conductor layer.

For example, as shown in FIG. 12, each of the second conductor layers 30 does not have any protrusion portion differently from the first conductor layer 20. That is, the second conductor layer 30 is formed so that the pair of second metal pieces 31 and 32 and the second conductor 33 are the same in thickness. FIG. 12 is a side view of the second conductor layer 30.

Incidentally, the case where the second conductor layers 30 are formed by etching has been shown in the Example. However, the second conductor layers 30 may be formed by pressing.

Figure 13:
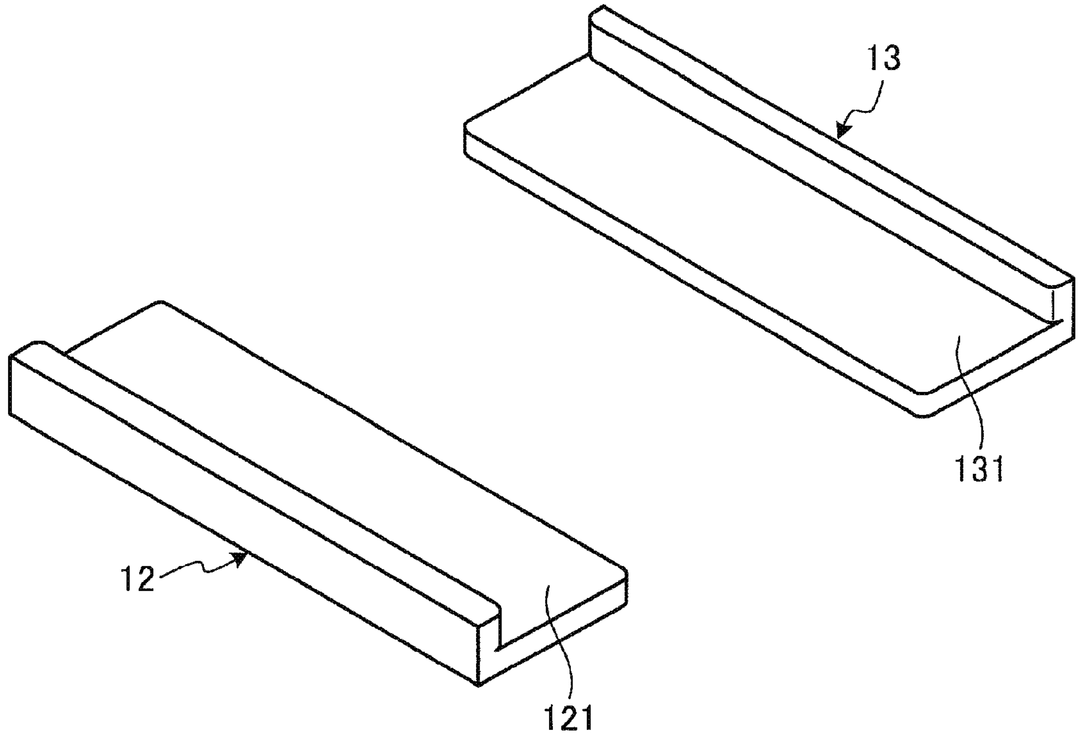
FIG. 13 is a view showing a specific example of an electrode forming step.
Figure 14:
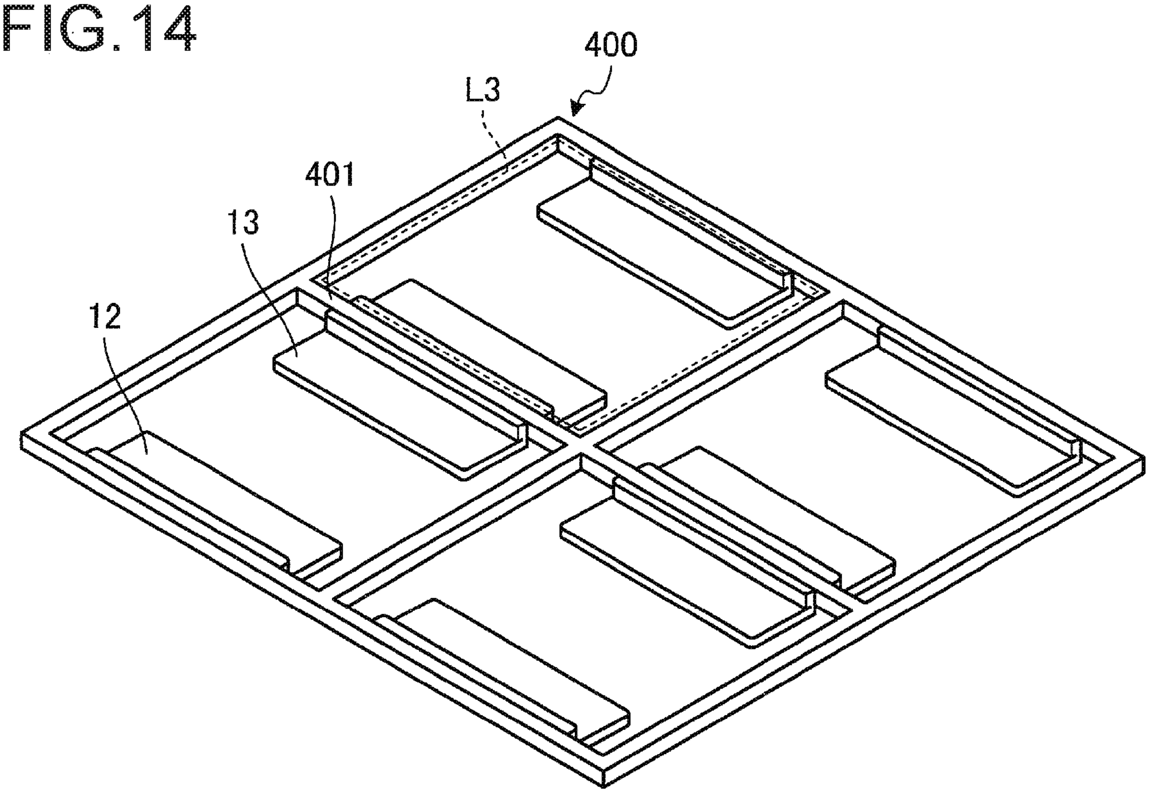
FIG. 14 is a perspective view of a third metal plate.

When the second conductor layers 30 have been formed, pairs of electrodes 12 and 13 are formed (step S13). That is, a third metal plate which is, for example, made of metal such as copper and which is shaped like a flat plate is etched so that the pairs of electrodes 12 and 13 are formed, for example, as shown in FIG. 13. FIG. 13 is a view showing a specific example of the electrode forming step. The third metal plate has a plurality of individual regions arrayed in a matrix form. The pairs of electrodes 12 and 13 are formed in the individual regions of the third metal plate respectively. For example, as shown in FIG. 14, a third metal plate 400 has 2×2 individual regions arrayed in a matrix form, and pairs of electrodes 12 and 13 are formed in the individual regions of the third metal plate 400 respectively. FIG. 14 is a perspective view of the third metal plate 400. At a stage where the pairs of electrodes 12 and 13 are formed in the individual regions of the third metal plate 400 respectively, each of the pairs of electrodes 12 and 13 are connected to a connecting frame 401 formed between adjacent ones of the individual regions. When the third metal plate 400 is cut along cutting lines L3 positioned in boundaries of the individual regions respectively, the pairs of electrodes 12 and 13 are individually separated from the connecting frame 401, as shown in FIG. 13. However, the third metal plate 400 has not been cut yet at the stage where the pairs of electrodes 12 and 13 are formed.

Figure 15:
FIG. 15 is a side view of the pair of electrodes.

Each of the pairs of electrodes 12 and 13 are formed by etching and half etching so that overhanging portions 121 and 131 overhang in directions perpendicular to a thickness direction of the pair of electrodes 12 and 13 from inner side faces of the pair of electrodes 12 and 13, for example, as shown in FIG. 15. FIG. 15 is a side view of the pair of electrodes 12 and 13. Due to the overhanging portions 121 and 131 overhanging from the inner side faces of the pair of electrodes 12 and 13, areas of end faces 12*a* and 13*a* of the pair of electrodes 12 and 13 which serve as connection faces to electrodes of a circuit substrate can be expanded. Consequently, connection reliability in the pair of electrodes 12 and 13 can be improved.

In addition, thicknesses of the overhanging portions 121 and 131 are made thinner than the other portions of the pair of electrodes 12 and 13. Thus, upper faces of body portions of the pair of electrodes 12 and 13 protrude more upward than upper faces of the overhanging portions 121 and 131. Thus, when the second conductor layer 30 and the pair of electrodes 12 and 13 are superimposed on each other to be bonded thereto in a bonding step which will be described later, contact between a lower face of the second conductor 33 and upper faces of the overhanging portions 121 and 131 can be prevented.

Incidentally, the case where the pair of electrodes 12 and 13 are formed by etching and half etching has been shown in the Example. However, the pair of electrodes 12 and 13 may be formed by pressing.

In addition, the aforementioned sequence of the first conductor layer forming step (the step S11), the second conductor layer forming step (the step S2) and the electrode forming step (the step S13) can be altered desirably. For example, the first metal plate 200 may be etched to form the first conductor layers 20 after the third metal plate 400 is etched to form the pairs of electrodes 12 and 13.

When each of the first conductor layers 20, each of the second conductor layers 30 and each of the pairs of electrodes 12 and 13 have been formed, the first conductor layer 20, the second conductor layer 30 and the pair of electrodes 12 and 13 are sequentially superimposed on one another to be bonded thereto. That is, the pair of second metal pieces 31 and 32 of the second conductor layer 30 are superimposed on the pair of first metal pieces 21 and 22 of the first conductor layer 20 to be bonded thereto respectively. In addition, the inner circumferential side end portion 332 of the second conductor 33 is superimposed on the inner circumferential side end portion 232 (the protrusion portion 233) of the first conductor 23 to be bonded thereto. Further, the pair of electrodes 12 and 13 are superimposed on the pair of second metal pieces 31 and 32 to be bonded thereto respectively. For example, diffusion bonding or bonding using solders or metal pastes can be used as the bonding method. Since the first conductor layer 20, the second conductor layer 30 and the pair of electrodes 12 and 13 are sequentially superimposed on one another to be bonded thereto, a bonding structure body in which the first conductor layer 20, the second conductor layer 30 and the pair of electrodes 12 and 13 are bonded to one another is formed.

Figure 16:
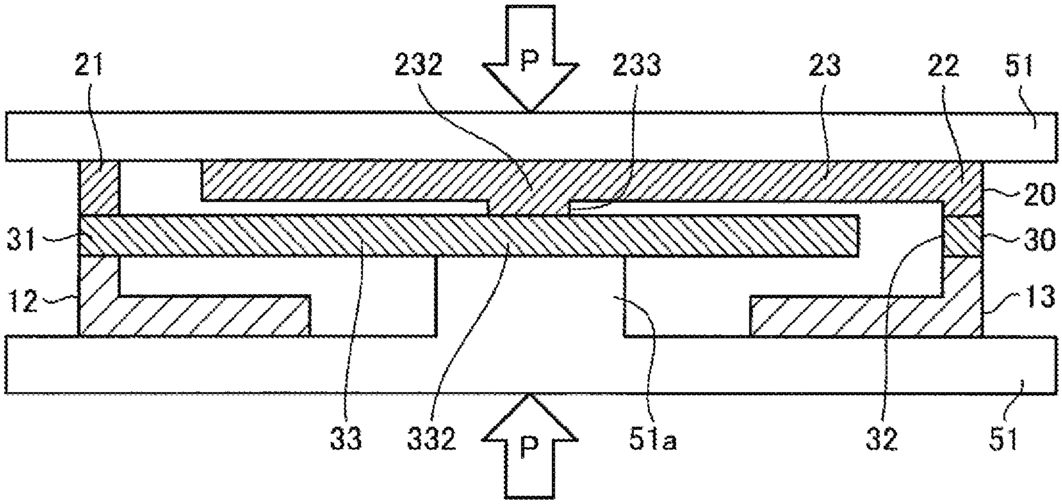
FIG. 16 is a view showing a specific example of a bonding step using diffusion bonding.

FIG. 16 is a view showing a specific example of the bonding step using diffusion bonding. That is, for example, as shown in FIG. 16, the pair of electrodes 12 and 13 are disposed on a flat plate-like carbon jig 51 where a protrusion portion 51*a* is formed so that the protrusion portion 51*a* is interposed between the pair of electrodes 12 and 13. Successively, the second conductor layer 30 is disposed on the pair of electrodes 12 and 13 and on the protrusion portion 51*a* of the carbon jig 51. Successively, the first conductor layer 20 is disposed on the second conductor layer 30. Successively, another flat plate-like carbon jig 51 is disposed on the first conductor layer 20. A space surrounding the disposed members is kept in a vacuum state. Pressures Pare applied to the two carbon jigs 51 in directions in which the carbon jigs 51 are deposited, and the two carbon jigs 51 are heated. Thus, atoms are diffused in contact faces between the pair of first metal pieces 21 and 22 and the pair of second metal pieces 31 and 32 to thereby bond the pair of first metal pieces 21 and 22 and the pair of second metal pieces 31 and 32 to each other respectively. In addition, atoms are diffused in a contact face between the inner circumferential side end portion 232 (the protrusion portion 233) of the first conductor 23 and the inner circumferential side end portion 332 of the second conductor 33 to thereby bond the inner circumferential side end portion 232 (the protrusion portion 233) of the first conductor 23 and the inner circumferential side end portion 332 of the second conductor 33 to each other. Further, atoms are diffused in contact faces of the pair of second metal pieces 31 and 32 and the pair of electrodes 12 and 13 to thereby bond the pair of second metal pieces 31 and 32 and the pair of electrodes 12 and 13 to each other respectively. Such diffusion bonding can be performed under conditions that, for example, 0.005 $kN/mm^2$ is applied as each of the pressures P in a vacuum state of 10 Pa or less, and a temperature of 600° C. is maintained for 5 minutes.

Figure 17:
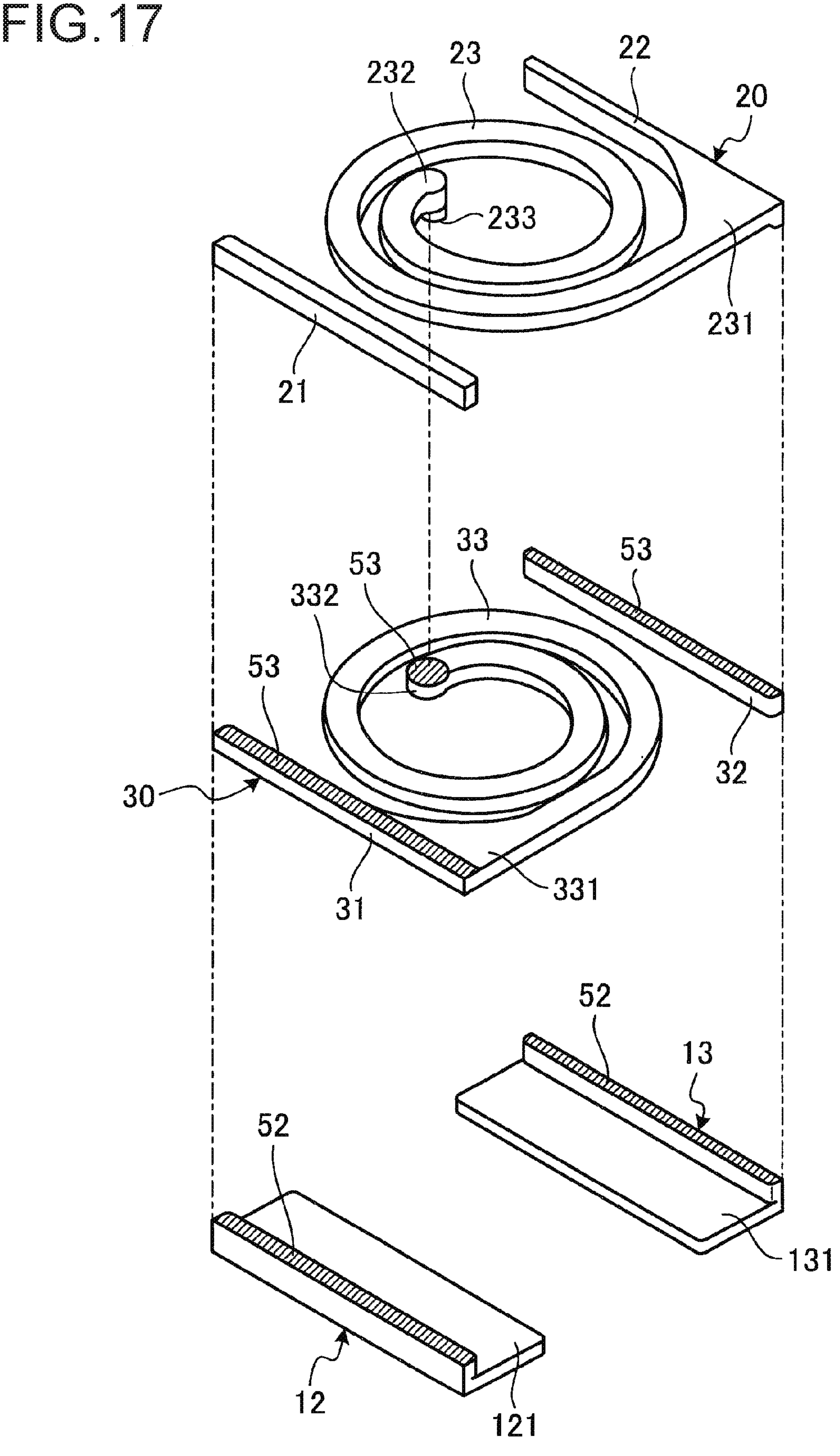
FIG. 17 is a view showing a specific example of a bonding step using solders or metal pastes.

FIG. 17 is a view showing a specific example of the bonding step using solders or metal pastes. That is, for example, as shown in FIG. 17, bonding materials 52 which are solders or metal pastes are applied to bonding faces of the pair of electrodes 12 and 13 to the pair of second metal pieces 31 and 32. Further, bonding materials 53 which are solders or metal pastes are applied to bonding faces of the pair of second metal pieces 31 and 32 to the pair of first metal pieces 21 and 22 and a bonding face of the end portion 332 to the end portion 232 (the protrusion portion 233). The members to which the bonding materials 52 and 53 are applied are deposited on one another. The bonding materials 52 and 53 are melted by heat and then cooled and solidified. Thus, the deposited members are bonded to one another.

The members are directly bonded to one another by the diffusion bonding which has been described by use of FIG. 16. Accordingly, connection reliability can be improved, and electrical resistance can be reduced. On the other hand, the bonding using the solders or the metal pastes can be executed more easily than the diffusion bonding. Incidentally, only one of the individual regions of the first metal plate 200, one of the individual regions of the second metal plate 300 and one of the individual regions of the third metal plate 400 are shown in FIG. 16 and FIG. 17.

Figure 18:
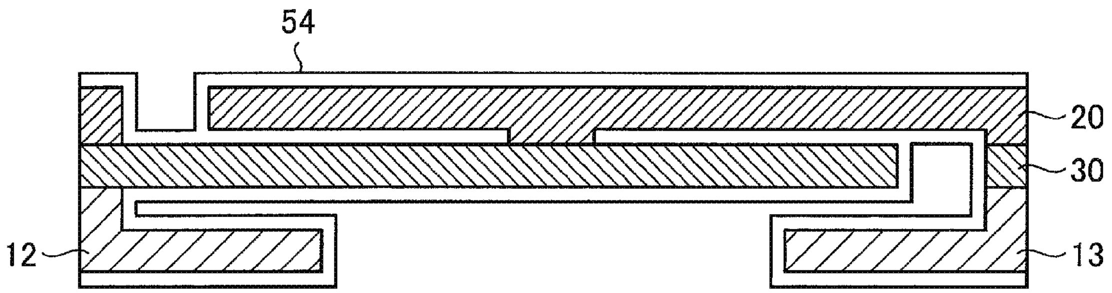
FIG. 18 is a view showing a specific example of an insulating film forming step.

When each of the bonding structure bodies in which the first conductor layer 20, the second conductor layer 30 and the pair of electrodes 12 and 13 are bonded to one another has been formed, insulating films are formed to cover the surfaces of the first conductor layer 20, the second conductor layer 30 and the pair of electrodes 12 and 13 (step S15). That is, for example, by an electrodeposition coating method or a spray coat method, insulating films 54 are uniformly formed on the entire surfaces of the first conductor layer 20, the second conductor layer 30 and the pair of electrodes 12 and 13, for example, as shown in FIG. 18. FIG. 18 is a view showing a specific example of the insulating film forming step. Only one of the individual regions of the first metal plate 200, one of the individual regions of the second metal plate 300 and one of the individual regions of the third metal plate 400 are shown in FIG. 18. For example, an insulating resin such as an epoxy resin or a polyimide resin can be used as the material of the insulating films 54. Incidentally, immersion into a liquid resin can be listed as another example of the method for forming the insulating films 54.

Figure 19:
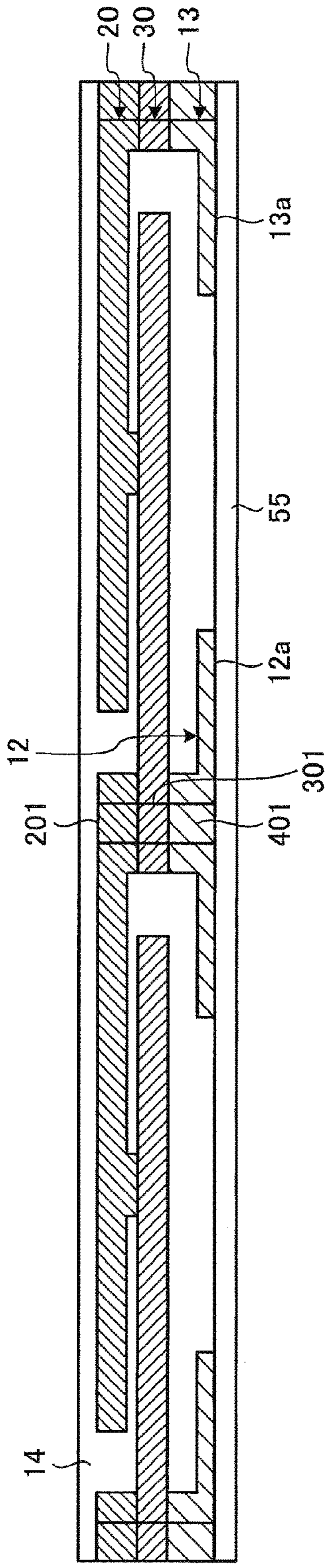
FIG. 19 is a view showing a specific example of a sealing resin forming step.

When the insulating films 54 have been formed, a sealing resin 14 is formed to cover the first conductor layer 20, the second conductor layer 30 and the pair of electrodes 12 and 13 but to expose the end faces 12*a* and 13*a* of the pair of electrodes 12 and 13 in a lower face 14*a* facing the second conductor layer 30 (step S16). That is, for example, as shown in FIG. 19, a sealing tape 55 is pasted on the side of the end faces 12*a* and 13*a* of the pair of electrodes 12 and 13 of the bonding structure body. The bonding structure body is disposed between an upper side mold and a lower side mold of a molding apparatus. A magnetic material-including resin is press-fitted into the bonding structure body so that the sealing resin 14 is formed. FIG. 19 is a view showing a specific example of the sealing resin forming step. When the sealing resin 14 has been formed, the sealing tape 55 is removed from the bonding structure body. Incidentally, illustration of the insulating films 54 is omitted from FIG. 19 for convenience of explanation. Since the sealing tape 55 is removed from the bonding structure body, the end faces 12*a* and 13*a* of the pair of electrodes 12 and 13 are exposed from the sealing resin 14. By brushing processing or blasting processing applied to the end faces 12*a* and 13*a* of the pair of electrodes 12 and 13 exposed from the sealing resin 14, the insulating film 54 provided on the end faces 12*a* and 13*a* is removed.

Figure 20:
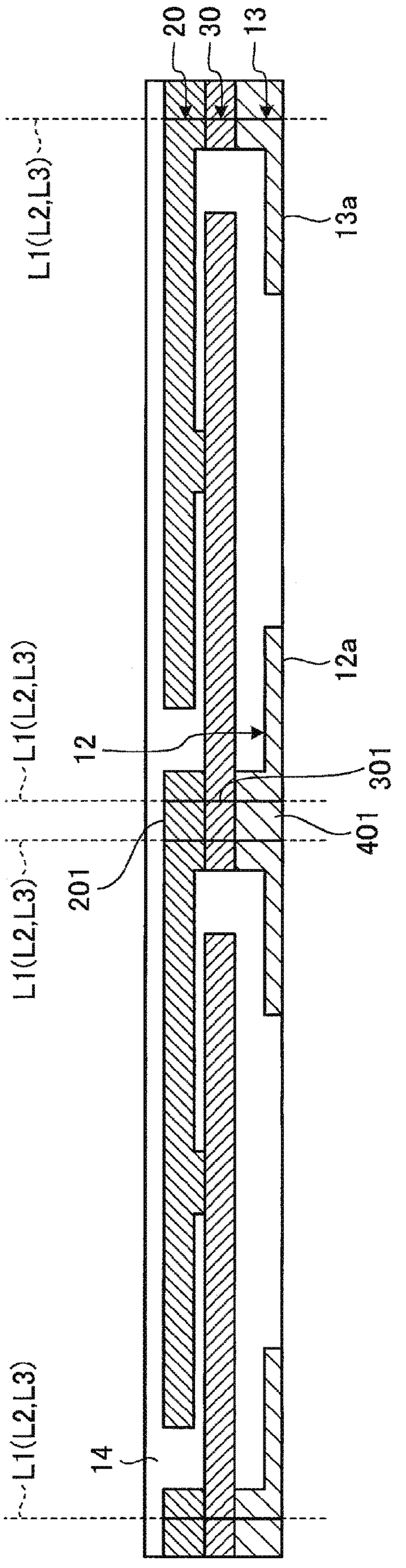
FIG. 20 is a view showing a specific example of a cutting step.

After the insulating film 54 has been removed, the bonding structure body is cut (step S17). That is, for example, as shown in FIG. 20, the bonding structure body is cut along the cutting lines L1 to be separated into an individual piece. FIG. 20 is a view showing a specific example of the cutting step. Thus, the first conductor layer 20, the second conductor layer 30 and the pair of electrodes 12 and 13 are separated from the connecting frames 201, 301 and 401 at places of the cutting lines L1, the cutting lines L2 and the cutting lines L3. Thus, the inductor 1 having the first conductor layer 20, the second conductor layer 30 and the pair of electrodes 12 and 13 is generated. On this occasion, the side faces 14*b* and 14*c* of the sealing resin 14, the outer side faces of the pair of first metal pieces 21 and 22, the outer side faces of the pair of second metal pieces 31 and 32 and the outer side faces of the pair of electrodes 12 and 13 are formed as cut faces to be flush with one another. The outer side faces of the pair of first metal pieces 21 and 22, the outer side faces of the pair of second metal pieces 31 and 32 and the outer side faces of the pair of electrodes 12 and 13 are exposed in the side faces 14*b* and 14*c* of the sealing resin 14.

Figure 21:
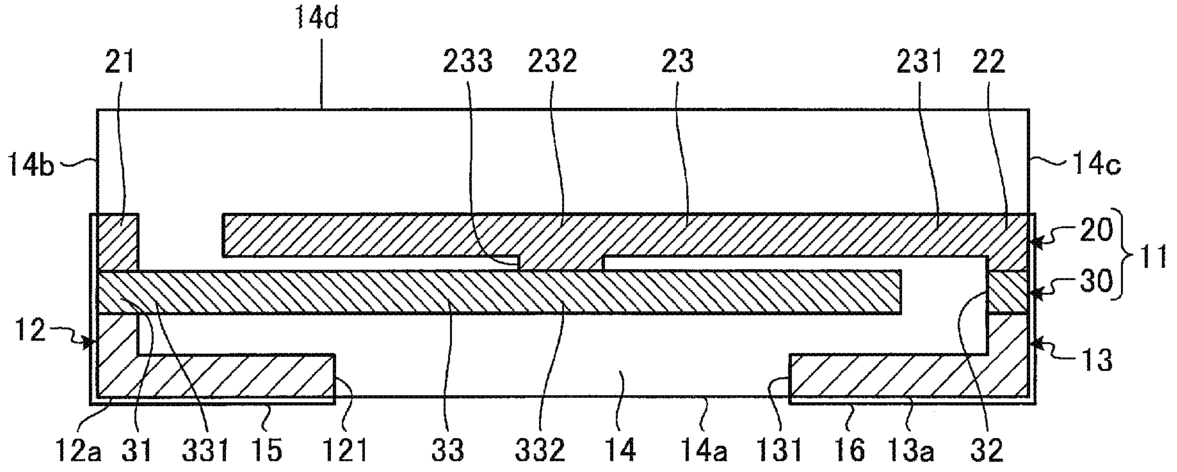
FIG. 21 is a view showing a specific example of a plating film forming step.

Then, plating films 15 and 16 are formed to cover the exposed end faces 12*a* and 13*a* of the pair of electrodes 12 and 13, the exposed outer side faces of the pair of first metal pieces 21 and 22, the exposed outer side faces of the pair of second metal pieces 31 and 32 and the exposed outer side faces of the pair of electrodes 12 and 13 (step S18). That is, for example, as shown in FIG. 21, the plating film 15 is formed on the end face 12*a* of the electrode 12 which is exposed in the lower face 14*a* of the sealing resin 14 and on the outer side face of the first metal piece 21, the outer side face of the second metal piece 31 and the outer side face of the electrode 12 which are exposed in the side face 14*b* of the sealing resin 14. At the same time, the plating film 16 is formed on the end face 13*a* of the electrode 13 which is exposed in the lower face 14*a* of the sealing resin 14 and on the outer side face of the first metal piece 22, the outer side face of the second metal piece 32 and the outer side face of the electrode 13 which are exposed in the side face 14*c* of the sealing resin 14. FIG. 21 is a view showing a specific example of the plating film forming step. The plating films 15 and 16 are formed, for example, by an electrolytic plating method or a barrel plating method. For example, Ni/Pd/Au, Ni/Au, Ni/Ag, Ni/Sn, Sn or solder can be used as the material of the plating films 15 and 16. By the aforementioned steps, the inductor 1 shown in FIG. 1 to FIG. 3 is completed.

Figure 22:
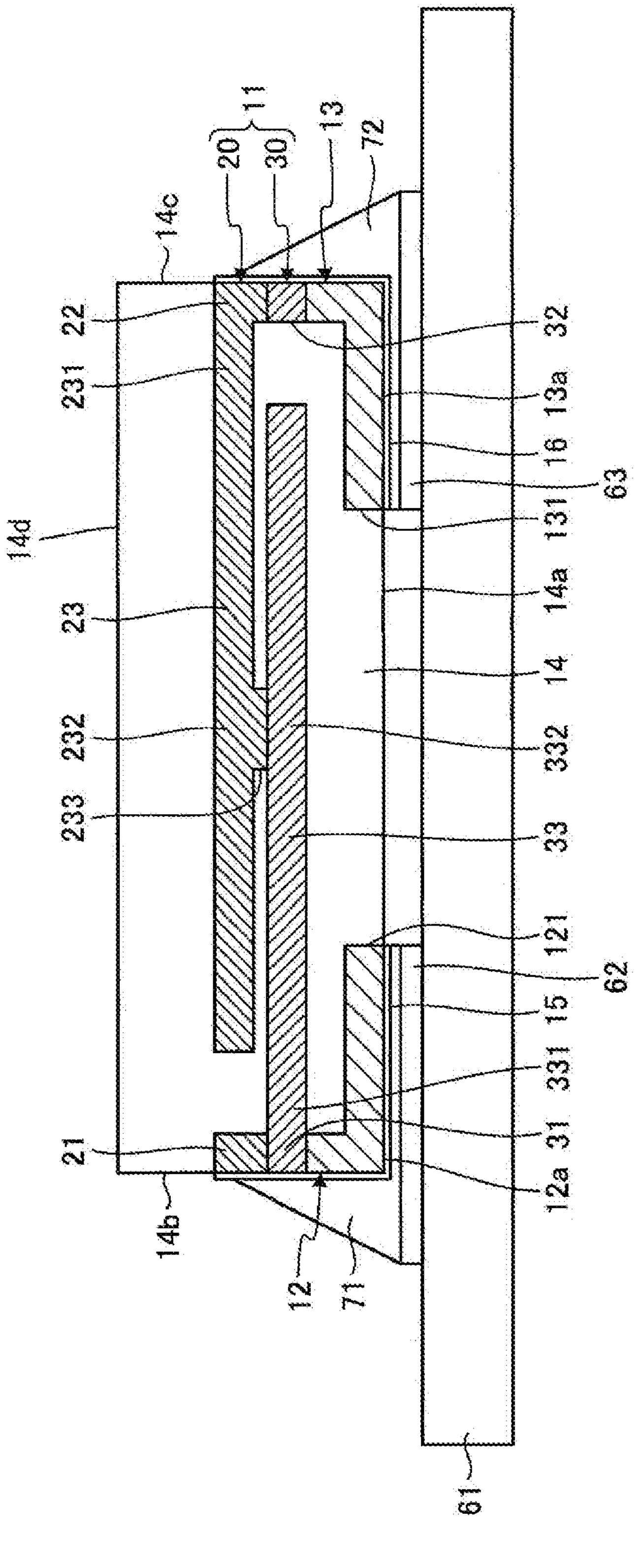
FIG. 22 is a view showing a state in which the inductor is mounted on a circuit substrate.

Next, a state in which the inductor 1 is mounted on a circuit substrate 61 will be described with reference to FIG. 22. FIG. 22 is a view showing a state in which the inductor 1 is mounted on the circuit substrate 61.

When the pair of electrodes 12 and 13 whose end faces 12*a* and 13*a* and outer side faces have been covered with the plating films 15 and 16 are soldered to a pair of electrodes 62 and 63 of the circuit substrate 61 respectively, the inductor 1 is mounted on the circuit substrate 61. Here, the plating films 15 and 16 are formed on the end faces 12*a* and 13*a* of the pair of electrodes 12 and 13 and the outer side faces of the pair of electrodes 12 and 13, as described above. Therefore, when the pair of electrodes 12 and 13 are soldered to the pair of electrodes 62 and 63 of the circuit substrate 61 respectively, the solders get wet to spread to plating portions of the outer side faces of the pair of electrodes 12 and 13 in addition to plating portions of the end faces 12*a* and 13*a* of the pair of electrodes 12 and 13. Specifically, the solders get wet to spread to plating portions of the outer side faces of the pair of first metal pieces 21 and 22, the outer side faces of the pair of second metal pieces 31 and 32 and the outer side faces of the pair of electrodes 12 and 13, which are exposed from the side faces 14*b* and 14*c* of the sealing resin 14. Thus, fillets 71 and 72 generated by the solders are formed between the outer side faces of the pair of electrodes 12 and 13 and the pair of electrodes 62 and 63 of the circuit substrate 61. As a result, connection strength between the inductor 1 and the circuit substrate 61 can be improved, and connection reliability of the inductor 1 can be improved.

As described above, the inductor according to the Example has the first conductor layer, the second conductor layer, the pair of electrodes and the sealing resin. The first conductor layer has the pair of first metal pieces, and the first conductor which extends from one of the pair of first metal pieces toward the other first metal piece to be wound in a spiral shape in one and the same plane. The second conductor layer has the pair of second metal pieces which are superimposed on the pair of first metal pieces to be bonded thereto respectively, and the second conductor which extends from one of the pair of second metal pieces toward the other second metal piece to be wound in a spiral shape in one and the same plane, and which has the inner circumferential side end portion superimposed on the inner circumferential side end portion of the first conductor to be bonded thereto. The pair of electrodes are superimposed on the pair of second metal pieces to be bonded thereto respectively. The sealing resin covers the first conductor layer, the second conductor layer and the pair of electrodes. The end faces of the pair of electrodes are exposed in one face of the sealing resin facing the second conductor. Thus, an increase of the size of the inductor according to the Example on the sides of the sealing resin can be reduced in comparison with the background-art inductor in which the external electrodes protrude from the outer side faces of the sealing resin. As a result, reduction of the size of the inductor can be attained.

In addition, in the inductor according to the Example, the outer side faces of the pair of first metal pieces, the outer side faces of the pair of second metal pieces and the outer side faces of the pair of electrodes are exposed in the outer side faces of the sealing resin intersecting with the face of the sealing resin. The inductor further has the plating films formed to cover the exposed end faces of the pair of electrodes, the exposed outer side faces of the pair of first metal pieces, the exposed outer side faces of the pair of second metal pieces and the outer side faces of the pair of electrodes. Thus, when the pair of electrodes are soldered to the electrodes of the circuit substrate, the solders get wet to spread along the plating films 15 and 16 so as to form the fillets. Accordingly, connection reliability of the inductor can be improved.

In addition, in the inductor according to the Example, the pair of electrodes have the overhanging portions which overhang in the directions perpendicular to the thickness direction of the pair of electrodes from the inner side faces of the pair of electrodes. The lower faces of the overhanging portions positioned on an opposite side to the pair of second metal pieces are exposed in the face of the sealing resin. Thus, the areas of the end faces of the pair of electrodes which serve as the connection faces to the electrodes of the circuit substrate can be expanded so that connection reliability in the pair of electrodes can be improved.

In addition, in the inductor according to the Example, the first conductor has the protrusion portion provided on the inner circumferential side end portion of the first conductor so as to protrude more outward than the other portion of the first conductor, and the inner circumferential side end portion of the second conductor is superimposed on the protrusion portion to be bonded thereto. Thus, electrical resistance of the bonding portion between the first conductor layer and the second conductor layer can be reduced.

In addition, in the inductor according to the Example, the sealing resin is a magnetic material-including resin. Thus, the inductance value of the inductor can be improved.

It should be considered that the present disclosed Example is not limited but exemplified in all respects. The aforementioned Example may be omitted, replaced or changed in various modes without departing from the scope of attached Claims and the gist thereof.

For example, the case where the protrusion portion 233 is provided in the first conductor layer 20 has been shown by way of example in the aforementioned Example. However, the first conductor layer 20 may be entirely uniform in thickness without being half-etched. In this case, the upper face of the second conductor 33 in the second conductor layer 30 is half-etched so that a protrusion portion is provided on the upper face of the inner circumferential side end portion 332 of the second conductor 33. In addition, in the second conductor layer 30, the thicknesses of the pair of second metal pieces 31 and 32 are the same as the thickness (thickness including thickness of the protrusion portion provided on the upper face of the end portion 332) of the inner circumferential side end portion 332 of the second conductor 33. Further, the upper faces of the pair of second metal pieces 31 and 32 are formed so as to protrude more outward than the upper face of the other portion of the second conductor 33 than the protrusion portion.

Various aspects of the subject matter described herein are set out non-exhaustively in the following numbered clauses:

1) A method for manufacturing an inductor, the method comprising:

forming a first conductor layer comprising: a pair of first metal pieces; and a first conductor, wherein the first conductor extends from one of the pair of first metal pieces toward the other first metal piece to be wound in a spiral shape in the same plane;

forming a second conductor layer comprising a pair of second metal pieces and a second conductor, wherein the second conductor extends from one of the pair of second metal pieces toward the other second metal piece to be wound in a spiral shape in the same plane;

forming a pair of electrodes;

bonding the first conductor layer to the second conductor layer such that each of the pair of first metal pieces are bonded to a corresponding one of the pair of second metal pieces, and an inner circumferential side end portion of the first conductor is bonded to an inner circumferential side end portion of the second conductor;

bonding each of the pair of second metal pieces to a corresponding one of the pair of electrodes; and covering the first conductor layer, the second conductor layer and the pair of electrodes with a sealing resin, wherein end faces of the pair of electrodes are exposed in a lower face of the sealing resin facing the second conductor.

What is claimed is:

1. An inductor comprising:

a first conductor layer comprising:

a pair of first metal pieces; and a first conductor, wherein the first conductor extends from one of the pair of first metal pieces to the other first metal piece to be wound in a spiral shape in a same plane of the first conductor;

a second conductor layer comprising:

a pair of second metal pieces, wherein each of the pair of second metal pieces is bonded to a corresponding one of the pair of first metal pieces; and a second conductor, wherein the second conductor extends from one of the pair of second metal pieces toward the other second metal piece to be wound in a spiral shape in a same plane of the second conductor, and the second conductor comprises an inner circumferential side end portion bonded to an inner circumferential side end portion of the first conductor;

a pair of electrodes each of which is bonded to a corresponding one of the pair of second metal pieces;

a sealing resin that covers the first conductor layer, the second conductor layer and the pair of electrodes; and an insulating film that covers surfaces of the pair of first metal pieces, surfaces of the pair of second metal pieces, and surfaces of the pair of electrodes, the insulating film being disposed between the sealing resin and each of the first conductor layer, the second conductor layer, and the pair of electrodes, wherein the sealing resin comprises:

a lower face that faces the second conductor;

an upper face that faces the first conductor and that is opposite to the lower face; and side faces that are positioned between the lower face and the upper face, each of the pair of electrodes includes:

a bonding portion; and an overhanging portion integrally formed with the bonding portion, the overhanging portion overhangs in a direction perpendicular to a thickness direction of the bonding portion from an inner side face on one end side of the bonding portion, another end side of the bonding portion of each of the pair of electrodes is bonded to the corresponding one of the pair of second metal pieces, a lower face of each of the pair of electrodes is defined by an end face on the one end side of the bonding portion of each of the pair of electrodes and an end face of the overhanging portion of each of the pair of electrodes positioned on an opposite side to the corresponding one of the pair of second metal pieces, the lower face of each of the pair of electrodes is exposed from the sealing resin in the lower face of the sealing resin so as to be flush with the lower face of the sealing resin, an outer side face of the bonding portion of each of the pair of electrodes is exposed from a respective one of the side faces of the sealing resin and is flush with the respective one of the side faces of the sealing resin, an inner side face on the another end side of the bonding portion of each of the pair of electrodes and an end face of the overhanging portion of each of the pair of electrodes which is positioned on a same side as the corresponding one of the pair of second metal pieces are covered by the sealing resin, the outer side face of the bonding portion of each of the pair of electrodes and the lower face of each of the pair of electrodes are exposed from the insulating film, and wherein the insulating film covers an entirety of the inner side face on the another end side of the bonding portion of each of the pair of electrodes and an entirety of the end face of the overhanging portion of each of the pair of electrodes which is positioned on the same side as the corresponding one of the pair of second metal pieces.

2. The inductor according to claim 1, wherein:

the side faces of the sealing resin are flush with outer side faces of the pair of first metal pieces and outer side faces of the pair of second metal pieces.

3. The inductor according to claim 1, wherein the inner circumferential side end portion of the second conductor is directly bonded to the inner circumferential side end portion of the first conductor.

4. The inductor according to claim 1, wherein the first conductor comprises a protrusion portion that protrudes from the inner circumferential side end portion of the first conductor;

the inner circumferential side end portion of the second conductor is bonded to the protrusion portion; and the protrusion portion is formed integrally with the inner circumferential side end portion of the first conductor.

5. The inductor according to claim 1, wherein only the another end side of the bonding portion of each of the pair of electrodes is bonded to the corresponding one of the pair of the second metal pieces.

* * * * *